United States Patent
Baker

(10) Patent No.: US 9,181,044 B1
(45) Date of Patent: Nov. 10, 2015

(54) MECHANICALLY CONTROLLED VACUUM THROTTLE FOR A CONTINUOUS DENSE PHASE PARTICULATE MATERIAL CONVEYING SYSTEM AND METHOD

(75) Inventor: Todd E. Baker, Lawrence, KS (US)

(73) Assignee: HORIZON SYSTEMS, INC., Lawrence, KS (US)

( * ) Notice: Subject to any disclaimer, the term of this patent is extended or adjusted under 35 U.S.C. 154(b) by 599 days.

(21) Appl. No.: 13/372,702

(22) Filed: Feb. 14, 2012

(51) Int. Cl.
  *B65G 51/16* (2006.01)
  *B65G 51/00* (2006.01)

(52) U.S. Cl.
  CPC ....................... *B65G 51/00* (2013.01)

(58) Field of Classification Search
  USPC ......... 406/127, 128, 129, 130, 131, 132, 133, 406/144, 14, 16, 65
  See application file for complete search history.

(56) References Cited

U.S. PATENT DOCUMENTS

| | | | | |
|---|---|---|---|---|
| 2,192,287 A | * | 3/1940 | Goebels | 406/138 |
| 3,115,278 A | * | 12/1963 | Mylting | 406/25 |
| 3,693,840 A | * | 9/1972 | Starr | 406/129 |
| 4,502,819 A | * | 3/1985 | Fujii et al. | 406/14 |
| 4,824,295 A | * | 4/1989 | Sharpless | 406/109 |
| 4,884,923 A | * | 12/1989 | Wellink | 406/41 |
| 5,051,040 A | * | 9/1991 | Croonenbrock et al. | 406/63 |
| 5,407,305 A | * | 4/1995 | Wallace | 406/14 |
| 6,079,461 A | * | 6/2000 | Fisher et al. | 141/231 |
| 8,628,276 B2 | * | 1/2014 | Delves et al. | 406/143 |
| 8,747,029 B2 | * | 6/2014 | Thorn | 406/197 |
| 8,936,416 B2 | * | 1/2015 | Stutz et al. | 406/132 |

* cited by examiner

*Primary Examiner* — Joseph Dillon, Jr.
(74) *Attorney, Agent, or Firm* — Kutak Rock LLP; Bryan P. Stanley

(57) ABSTRACT

A mechanically-controlled vacuum throttle for a continuous dense phase pneumatic conveying system and related method is provided. The system includes a pneumatic conveyance line, a particulate material insertion assembly, a positive displacement blower, a transport fluid intake assembly, and a vacuum throttling assembly. The vacuum throttling assembly is configured to control the flow of air mass density into the blower and through the conveyance line. A portion of the vacuum throttling assembly is tied in to the conveyance line pressure downstream of the blower and adjusts the air mass density flow depending on the downstream pressure. Preferably, the vacuum throttling assembly includes an obstruction element and an opening collar, where the obstruction element is moveable relative to the opening collar and the air mass density flow is adjusted depending on the amount of movement of the obstruction element relative to the opening collar.

20 Claims, 9 Drawing Sheets

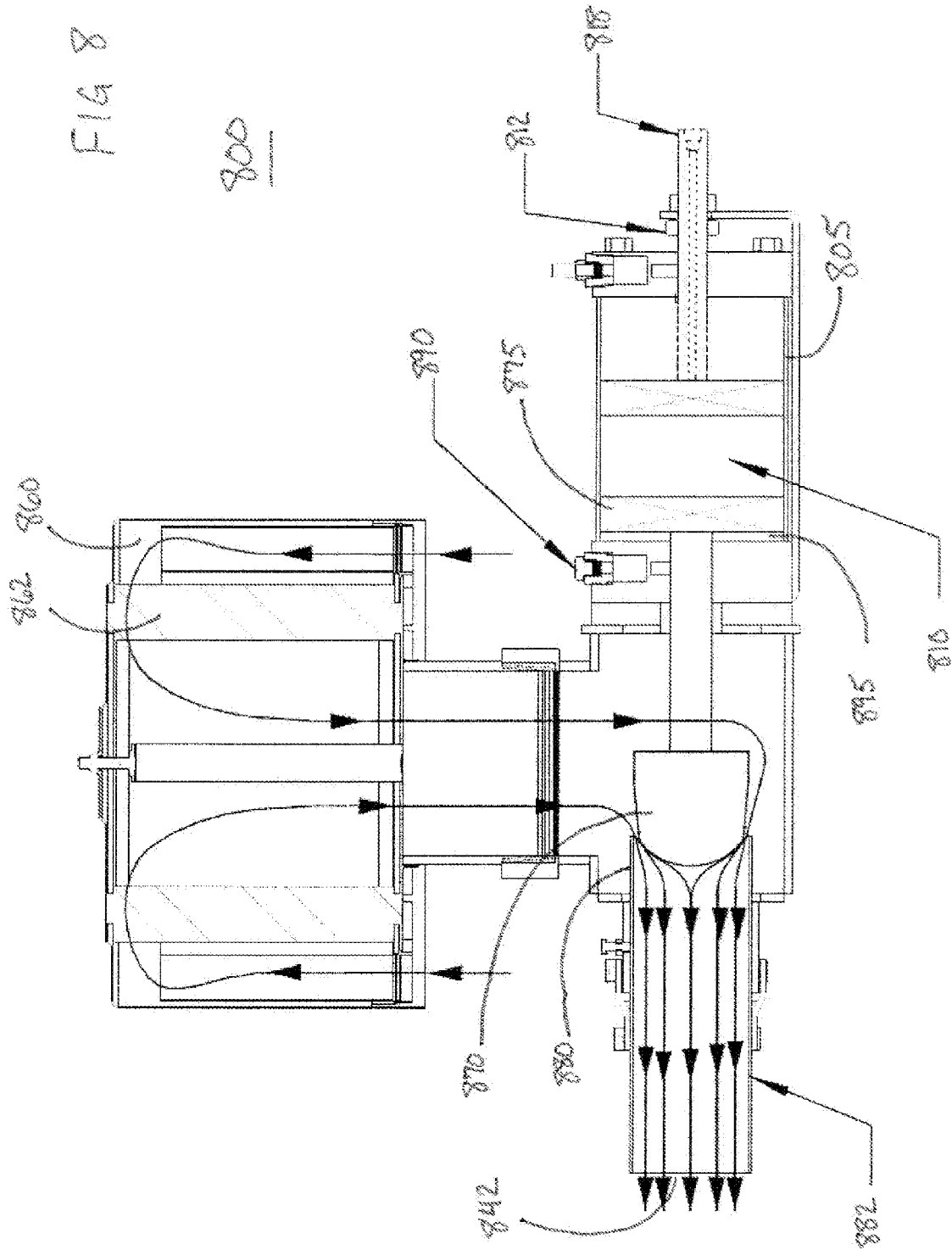

MECHANICALLY CONTROLLED VACUUM THROTTLE FOR A CONTINUOUS DENSE PHASE PARTICULATE MATERIAL CONVEYING SYSTEM AND METHOD

FIELD

The present inventive concept relates generally to a continuous dense phase pneumatic conveying system used to transport particulate material. Particularly, the inventive concept relates to mechanically-controlled, vacuum inlet throttling systems and methods.

BACKGROUND

Pneumatic conveying systems are used to transport large quantities of particulate material through pipes. Examples of particulate material includes powders, granules, pellets, seeds, beans, nuts, pasta, pet foods, snack foods, and similar. In a common pneumatic conveying system, a fluid, usually air, is blown through the pipes. The air enters the pipes through a filtered air inlet. The particulate material enters the pipes through a material inlet. The air is mixed with the particulate material and together, the air and particulate material moves through the pipes. Both the air and the particulate material exit the pipes through an outlet.

Dilute phase conveying occurs when the particulate material is transported at a relatively high velocity (i.e., above the saltation point). Particles are suspended in the air stream to move at approximately the same velocity as the air stream. This results in a relatively low product to air ratio (i.e., less than 15:1). This also results in high particle-to-particle and particle-to-pipe interaction, and can lead to undesirable particle shear and breakdown.

Dense phase conveying occurs when the particulate material is transported at a relatively low velocity (i.e., well below the saltation point). A positive displacement blower is located upstream from the particulate material inlet. The positive displacement blower increases fluid (air) pressure within the pipes downstream of the positive displacement blower. Because the particles are not suspended in the fluid (air), they drop to the bottom of the pipe. The pressure from the positive displacement blower pushes the particles together into lumps or "slugs" within the pipe. The slugs of material are transported through the pipe with a pocket of fluid (air) between each slug. Dense phase conveying usually achieves a higher product to air ratio than dilute phase conveying. The lower velocities also result in lower particle-to-particle and particle-to-pipe interaction.

Dense phase conveying systems may be generally described as either batch or continuous.

In a batch dense phase conveying system, the particulate material is loaded into a special container, sometimes called a pressure pot. The container is sealed off and pressurized before the particulate material is introduced into the conveyance pipes. After the container is pressurized, the particulate material is introduced into the conveyance system and transported through the pipes. When the container is empty, the conveyance system is purged with a blast of high velocity fluid (air) to remove any lingering particulate material from that batch. The container is depressurized and refilled with a new batch of particulate material. In some of the more sophisticated batch dense phase conveying systems, two or more containers tie into the system so that one may be in a state of depressurization such that it can be refilled while simultaneously another container is in a state of pressurization such that material can be transported through the pipes.

In a continuous dense phase conveying system, the vessel containing the particulate material generally is not pressurized. Instead, the particulate material is contained within a hopper and is introduced into the pipes via a multi-vane rotary airlock. Typically, the airlock provides metering, to some extent, of the particulate material so that the rate of entry into the pipes is somewhat steady. The airlock also controls, but does not eliminate, fluid (air) leakage out of the system. The hopper is filled and refilled with particulate material, at ambient pressure. The particulate material is continuously fed into the pipes via the airlock and continuously extruded through the pipes, thus eliminating the downtime associated with the purge, depressurization, refill, and pressurization of the batch systems.

Ideally, the slugs of particulate material are transported in a wave form flow pattern that is continuous, predictable, and repeating. The air mass flow rate is critically important to achieve a continuous, predictable, and repeating slug wave form flow pattern. The air mass flow rate is regulated to achieve a constant ratio of air mass flow rate to material mass flow rate in order to achieve a steady state of conveying the slugs. Properly controlling the air mass flow (not air velocity) yields the desired steady state of conveyance.

A vacuum throttle is used to regulate air mass flow by controlling the density of the fluid (air) entering the pipes upstream of the positive displacement blower. A positioning mechanism moves a bullet-shaped element into and out of an orifice to create and regulate a low pressure, or vacuum, environment between the air inlet and the positive displacement blower. By controlling the distance that the bullet-shaped element is inserted into the orifice, the air density entering the pipes via the blower is controlled. By controlling the air density of the system, the air mass flow rate is controlled.

Current state-of-the-art vacuum throttled continuous dense phase pneumatic conveying systems encounter several drawbacks. First, air mass flow fluctuates due to blower slippage and airlock leakage. Second, material mass flow fluctuates due to feed rates into the system and bulk density variations. These, and other shortcomings, have been addressed by employing a complex series of valves and sensors or vacuum and pressure transducers on the blower inlet and discharge that provide electrical signals to a programmable logic controller (PLC). The PLC calculates how to move the bullet-shaped element with respect to the orifice in order to achieve the desired system vacuum relative to the discharge pressure.

The inventor has identified an unaddressed need to regulate the air mass flow without reliance on the complexities of the pressure and vacuum transducers and PLC. The inventor has discovered a means for controlling the air mass flow, by varying the position of the bullet in the vacuum throttle, using a solely mechanical control mechanism.

SUMMARY

Objects of the present inventive concept include, but are not necessarily limited to, providing a mechanically-controlled vacuum throttle for a continuous dense phase pneumatic conveying system that costs less and is easier to integrate into existing conveying systems than a comparable electrically or electromechanically controlled version.

One object of the inventive concept is to provide an improved system for continuous pneumatic conveyance of particulate material in the dense phase (i.e., well below the saltation point). The system includes a particulate material insertion assembly, sometimes referred to as an airlock and pick up shoe, configured to insert particulate material into a conveyance line or pipe. A positive displacement blower is located upstream from the particulate material insertion assembly. The system also includes a transport fluid intake assembly located upstream from the blower and configured to provide transport fluid from a supply of transport fluid into the blower and through the conveyance line.

The system also includes a vacuum throttling assembly located upstream from the blower and configured to control (i.e., vary) the flow of transport fluid mass density into the blower and through the conveyance line. The vacuum throttling assembly includes an obstruction element and an opening collar. The obstruction element and opening collar are configured to be mating elements, one with the other, and moveable, one relative to the other. When the obstruction element moves in one direction relative to the opening collar (e.g., inserted into the opening collar), the flow of transport fluid mass (i.e., density of transport fluid flow) is restricted. When the obstruction element moves in the opposite direction relative to the opening collar (e.g., withdrawn from the opening collar), the flow of transport fluid mass (i.e., density of transport fluid flow) is increased.

The blower feeds transport fluid through the conveyance line. As the blower feeds transport fluid through the conveyance line, pressure downstream from the blower is increased. The transport fluid is mixed with the particulate material. The particulate material is extruded through the conveyance line in discrete collections, sometimes referred to as lumps, balls, masses, or "slugs." A discrete pocket of pressurized transport fluid separates each slug from another.

To the extent that the ratio of transport fluid mass flow to particulate material mass flow is maintained constant, the slugs of particulate material are transported through the conveyance line in a wave form pattern. A portion of the vacuum throttling assembly is configured to be in fluid communication with the transport fluid pressure downstream of the blower. As fluid pressure downstream of the blower increases, the vacuum throttling assembly moves the obstruction element relative to the opening collar such that the vacuum decreases, resulting in increasing density (mass flow) of the transport fluid into the blower and through the conveyance line. As fluid pressure downstream of the blower decreases, the vacuum throttling assembly moves the obstruction element relative to the opening collar such that the vacuum increases, resulting in decreasing density (mass flow) of the transport fluid into the blower and through the conveyance line.

Another object of the inventive concept is to provide a mechanically controlled vacuum throttle assembly for a particulate material continuous dense phase pneumatic conveyance system that includes a conveyance line with a pressure side and a vacuum side. The vacuum throttle assembly includes an obstruction element and an opening collar in fluid communication with the vacuum (transport fluid intake) side of the conveyance line. The obstruction element and opening collar are configured to be mating elements, one with the other, and moveable, one relative to the other. When the obstruction element moves in one direction relative to the opening collar (e.g., inserted into the opening collar), the flow of transport fluid mass (i.e., density of transport fluid flow) is restricted. When the obstruction element moves in the opposite direction relative to the opening collar (e.g., withdrawn from the opening collar), the flow of transport fluid mass (i.e., density of transport fluid flow) is increased.

The vacuum throttle assembly includes a pressure pilot assembly in fluid communication with the pressure side of the pneumatic conveyance line. When the pressure on the pressure side of the conveyance line increases, the pressure pilot assembly mechanically moves the obstruction element relative to the opening collar such that the flow of transport fluid mass (i.e., density of transport fluid flow) is increased. When the pressure on the pressure side of the conveyance line decreases, the pressure pilot assembly mechanically moves the obstruction element relative to the opening collar such that the flow of transport fluid mass (i.e., density of transport fluid flow) is restricted.

Another object of the inventive concept is to provide a method of mechanically controlling air mass flow rate in a particulate material continuous dense phase pneumatic conveyance system having a conveyance line with a vacuum side and a pressure side. The method includes mechanically moving an obstruction element relative to an opening collar on the vacuum side of the conveyance line. The distance and direction of movement of the obstruction element relative to the opening collar occurs automatically depending on the pressure of the pressure side of the conveyance line. When the pressure on the pressure side of the conveyance line increases, the obstruction element moves relative to the opening collar such that the flow of transport fluid mass (i.e., density of transport fluid flow) is increased. When the pressure on the pressure side of the conveyance line decreases, the obstruction element moves relative to the opening collar such that the flow of transport fluid mass (i.e., density of transport fluid flow) is restricted.

The mechanically controlled vacuum throttle provides several advantages over an electrically or electromechanically controlled vacuum throttle. The mechanically controlled vacuum throttle generally requires fewer components. Fewer components means that there is reduced risk of component failure. Fewer components also generally results in reduced downtime when a component does fail.

The mechanically controlled vacuum throttle generally costs less than comparable electrically or electromechanically controlled throttles. In addition to having fewer components, the components of a mechanically controlled vacuum throttle are less complex and cost less than components required of electrically controlled throttles, such as pressure transducers and Programmable Logic Controllers (PLC).

The mechanically controlled vacuum throttle generally operates more efficiently than comparable electrically or electromechanically controlled vacuum throttles. The mechanically controlled vacuum throttle responds to changes in downstream pressure immediately and automatically, with very little, if any, delay. The relationship between the change in downstream pressure and the desirable corresponding change in upstream vacuum is linear. A minor change in downstream pressure should be countered by a correspondingly minor change in upstream vacuum. A major change in downstream pressure should be countered by a correspondingly major change in upstream vacuum. The mechanically controlled vacuum throttle of this inventive concept provides for a direct tie in between the downstream pressure change and the upstream vacuum change.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 8 is a lengthwise cross-sectional view of another embodiment of a vacuum throttle assembly of the inventive concept.

FIG. 9-A shows a top view. FIG. 9-B shows an exploded perspective. FIG. 9-C shows a vacuum side end view. FIG. 9-D shows a longitudinal cross-sectional view. FIG. 9-E shows a perspective view.

DETAILED DESCRIPTION

Figure 1:
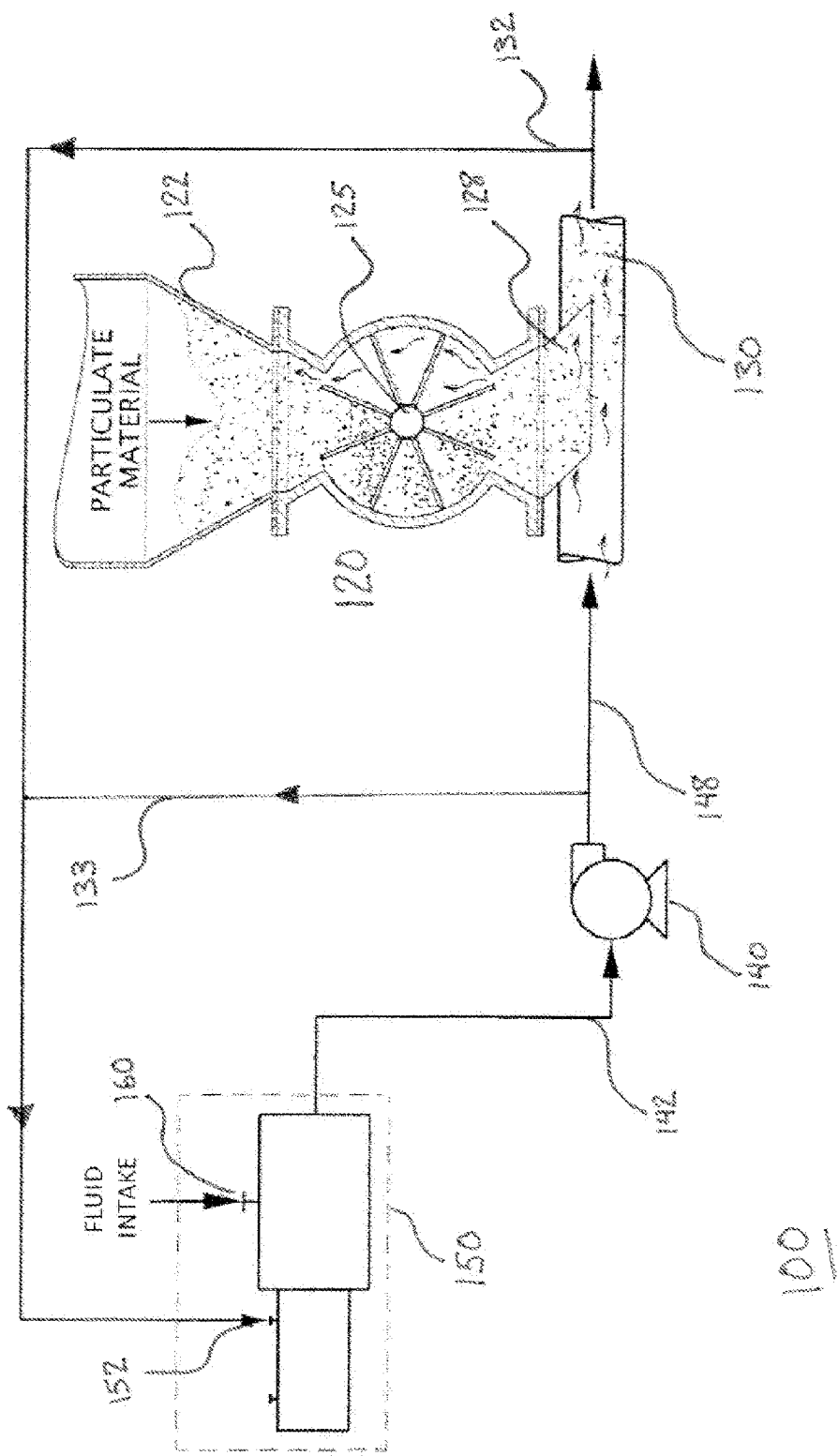
FIG. 1 shows an exemplary embodiment of a particulate material continuous dense phase pneumatic conveying system.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The inventive concept relates to an improved system for continuous pneumatic conveyance of particulate material in the dense phase (i.e., well below the saltation point). The system includes a particulate material insertion assembly, also known as an airlock or hopper. The insertion assembly is configured to insert particulate material into the conveyance line or pipe. The particulate material is stored at ambient atmospheric pressure. It preferably includes a nine or ten vane rotor airlock to transfer the particulate material into the pressurized conveyance line. The insertion assembly minimizes, but does not eliminate, fluid leakage.

A positive displacement blower is located upstream from the particulate material insertion assembly. The blower feeds transport fluid through the conveyance line. Preferably, the blower operates at a constant rpm while the particulate material is being inserted into the conveyance lines. The blower includes an inlet and an outlet and transfers transport fluid from the inlet to the outlet. A decrease in pressure, or vacuum, is created in the conveyance line upstream from the blower inlet. An increase in pressure is created in the conveyance line downstream from the blower outlet.

The system also includes a transport fluid intake assembly located upstream from the blower inlet. It is configured to provide transport fluid from a supply of transport fluid into the blower and through the conveyance line. By way of example, the transport fluid may be atmospheric air, a compressed inert gas, or any other suitable transport fluid. In the event that the transfer fluid is atmospheric air, the supply of transfer fluid may be the ambient atmosphere. In the event that the transfer fluid is a compressed inert gas, the supply of transfer fluid may be an enclosed reservoir (tank) of compressed inert gas.

The system also includes a vacuum throttling assembly located upstream from the blower. The vacuum throttling assembly is configured to control (i.e., vary) the flow of transport fluid mass density into the blower and through the conveyance line. The vacuum throttling assembly includes an obstruction element and an opening collar. The obstruction element and opening collar are configured to be mating elements, one with the other, and moveable, one relative to the other. Preferably, the obstruction element is bullet shaped such that when the obstruction element moves in one direction relative to the opening collar (e.g., inserted into the opening collar), the thicker part of the bullet obstructs a greater cross-sectional flow of transport fluid mass (i.e., density of transport fluid flow) through the opening collar. When the obstruction element moves in the opposite direction relative to the opening collar (e.g., withdrawn from the opening collar), the narrower part of the bullet obstructs a lesser cross-sectional flow of transport fluid mass (i.e., density of transport fluid flow) through the opening collar. In some embodiments, when the obstruction is fully inserted within the opening collar, the fluid flow cross-section is fully blocked, thus resulting in maximum vacuum to the inlet side of the blower. In some embodiments, when the obstruction is fully inserted within the opening collar, the fluid flow cross-section is not fully blocked. In some embodiments, when the obstruction is fully withdrawn from the opening collar, the fluid flow cross-section is completely unobstructed, thus resulting in minimum vacuum to the inlet side of the blower.

As the blower feeds transport fluid through the conveyance line, pressure downstream from the blower is increased. At the particulate material insertion assembly, the transport fluid is mixed with the particulate material. The particulate material is extruded through the conveyance line in discrete collections, sometimes referred to as lumps, balls, masses, or "slugs." A discrete pocket of pressurized transport fluid separates each slug from another.

To the extent that the ratio of transport fluid mass flow to particulate material mass flow is maintained constant, the slugs of particulate material are transported through the conveyance line in a wave form pattern. A portion of the vacuum throttling assembly is configured to be in fluid communication with the transport fluid pressure downstream of the blower. As fluid pressure downstream of the blower increases, the vacuum throttling assembly moves the obstruction element relative to the opening collar such that the vacuum decreases, resulting in increasing density (mass flow) of the transport fluid into the blower and through the conveyance line. As fluid pressure downstream of the blower decreases, the vacuum throttling assembly moves the obstruction element relative to the opening collar such that the vacuum increases, resulting in decreasing density (mass flow) of the transport fluid into the blower and through the conveyance line.

The movement of the obstruction element is relative to the opening collar. In some embodiments, the obstruction element is the moving component, being inserted or withdrawn, and the opening collar is unmoving. In other embodiments, the obstruction element remains unmoving and the opening collar is moved. In still other embodiments, both the obstruction element and the opening collar move and neither is static. Preferably, the opening collar includes an adjustment element configured to allow the opening collar to be mechanically moved in small increments, thus allowing a user to fine tune the minimum and maximum vacuum-side mass flow rates of the system. In preferred embodiments, the vacuum throttle assembly is enclosed within a protective outer casing.

Referring to the figures, an exemplary embodiment of a particulate material continuous dense phase pneumatic conveying system 100 is shown in FIG. 1. As shown in FIG. 1, a particulate material insertion assembly 120 inserts particulate material into the conveyance line 130. The insertion assembly 120 includes a supply of particulate material stored in a particulate material storage vessel 122. The insertion assembly 120 includes a multi-vane rotor 125 airlock that meters, somewhat, the insertion of particulate material into the conveyance line 130 and minimizes leakage of transport fluid out of the conveyance line 130. The particulate material is inserted into the conveyance line 130 via a pick up shoe 128. The pick up shoe 128 allows a predetermined volume of particulate material to accumulate before being inserted into the conveyance line 130. Preferably, the pick up shoe 128 includes a cross-sectional diameter that is smaller than the cross-sectional diameter of the conveyance line 130. The particulate material stored in the storage vessel 122 is stored at ambient atmospheric pressure.

The system of FIG. 1 also includes a positive displacement blower 140 upstream from the insertion assembly 120. The blower 140 includes an inlet and an outlet (indicated by in and out arrows). The blower transfers transport fluid from the inlet to the outlet and through the conveyance line 130. In FIG. 1, the vacuum side 142 of the blower is located upstream from the blower 140. The pressure side 148 of the blower is located downstream from the blower.

The system of FIG. 1 also includes a vacuum throttling assembly 150. The vacuum throttling assembly 150 is located upstream from the blower 140. The vacuum throttling assembly 150 is configured to control (i.e., vary) the flow of transport fluid mass density into the blower 140 and through the conveyance line 130. A portion 152 of the vacuum throttling assembly 150 is configured to be in fluid communication with the transport fluid pressure 132 or 133 downstream of the blower 140. In some embodiments, the portion 152 of the vacuum throttling assembly 150 is in fluid communication with the transport fluid pressure downstream of the particulate material insertion assembly 120 (132). In other embodiments, the portion 152 of the vacuum throttling assembly 150 is also in fluid communication with the transport fluid pressure downstream of the blower 140 and upstream of the insertion assembly 120 (133) so that it is closer to the control assembly. As fluid pressure 132 or 133 downstream of the blower 140 increases, the vacuum throttling assembly 150 moves mechanically such that the vacuum decreases, resulting in increasing density (mass flow) of the transport fluid into the blower 140 and through the conveyance line 130. As fluid pressure 132 or 133 downstream of the blower 140 decreases, the vacuum throttling assembly 150 moves mechanically such that the vacuum increases, resulting in decreasing density (mass flow) of the transport fluid into the blower 140 and through the conveyance line 130.

In FIG. 1, the transport fluid is ambient air. The supply of ambient air is the local atmosphere. The transport fluid intake assembly 160 is a component of the vacuum throttling assembly 150 and is located upstream from the blower 140.

Figure 2:
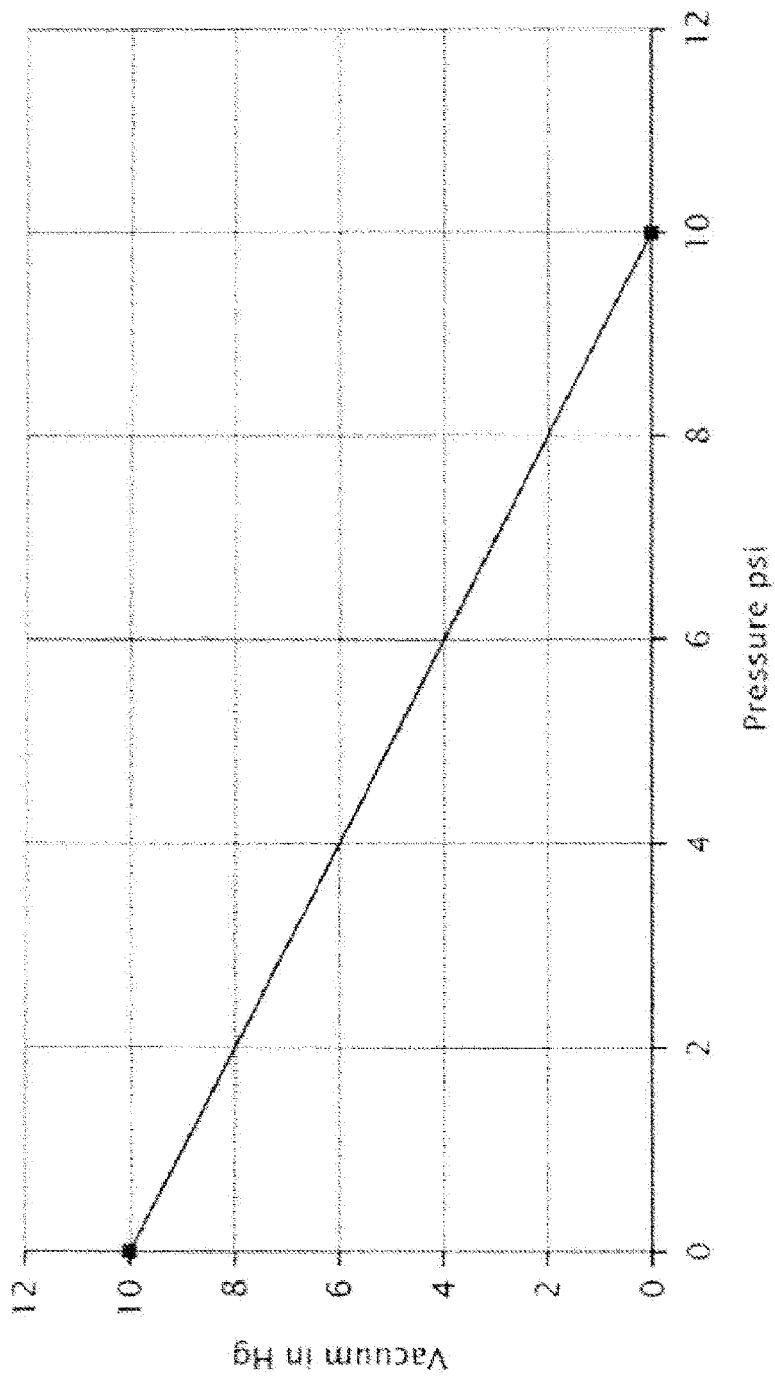
FIG. 2 shows a graph indicating the linear relationship between the pressure side and the vacuum side of a particulate material continuous dense phase pneumatic conveying system necessary to maintain a steady wave form flow of particulate material slugs through the system.

FIG. 2 shows a graph indicating the linear relationship between the pressure side and the vacuum side of a particulate material continuous dense phase pneumatic conveying system necessary to maintain a steady wave form flow of particulate material slugs through the system. As shown in FIG. 2, when the pressure in the conveying system is at a minimum, the vacuum should be at a maximum. In this context, maximum vacuum correlates to minimum fluid mass flow density. Conversely, when the vacuum is at a minimum, the downstream pressure will be at a maximum. As the pressure increases, the vacuum should correspondingly decrease in order to maintain a constant ratio of fluid mass flow to material mass flow. As the pressure decreases, the vacuum should correspondingly increase.

In other aspects, the inventive concept relates to a mechanically controlled vacuum throttle assembly for a particulate material continuous dense phase pneumatic conveyance system. The system includes a conveyance line with a pressure side and a vacuum side. The pressure side is located downstream from a positive displacement blower and the vacuum side is located upstream from the blower. The vacuum throttle assembly includes an obstruction element and an opening collar in fluid communication with the vacuum side of the conveyance line. Preferably, the vacuum throttle assembly is located just downstream from a transfer fluid intake assembly.

The obstruction element and opening collar are configured to be mating elements, one with the other, and moveable, one relative to the other. When the obstruction element moves in one direction relative to the opening collar (e.g., inserted into the opening collar), the flow of transport fluid mass (i.e., density of transport fluid flow) is restricted. When the obstruction element moves in the opposite direction relative to the opening collar (e.g., withdrawn from the opening collar), the flow of transport fluid mass (i.e., density of transport fluid flow) is increased.

The vacuum throttle assembly includes a pressure pilot assembly in fluid communication with the pressure side of the pneumatic conveyance line. When the pressure on the pressure side of the conveyance line increases, the pressure pilot assembly mechanically moves the obstruction element relative to the opening collar such that the flow of transport fluid mass (i.e., density of transport fluid flow) is increased. When the pressure on the pressure side of the conveyance line decreases, the pressure pilot assembly mechanically moves the obstruction element relative to the opening collar such that the flow of transport fluid mass (i.e., density of transport fluid flow) is restricted. Preferably, the opening collar includes an adjustment element configured to allow the opening collar to be mechanically moved in small increments, thus allowing a user to fine tune the minimum and maximum vacuum-side mass flow rates of the system. In preferred embodiments, the vacuum throttle assembly is enclosed within a protective outer casing.

Figure 3:
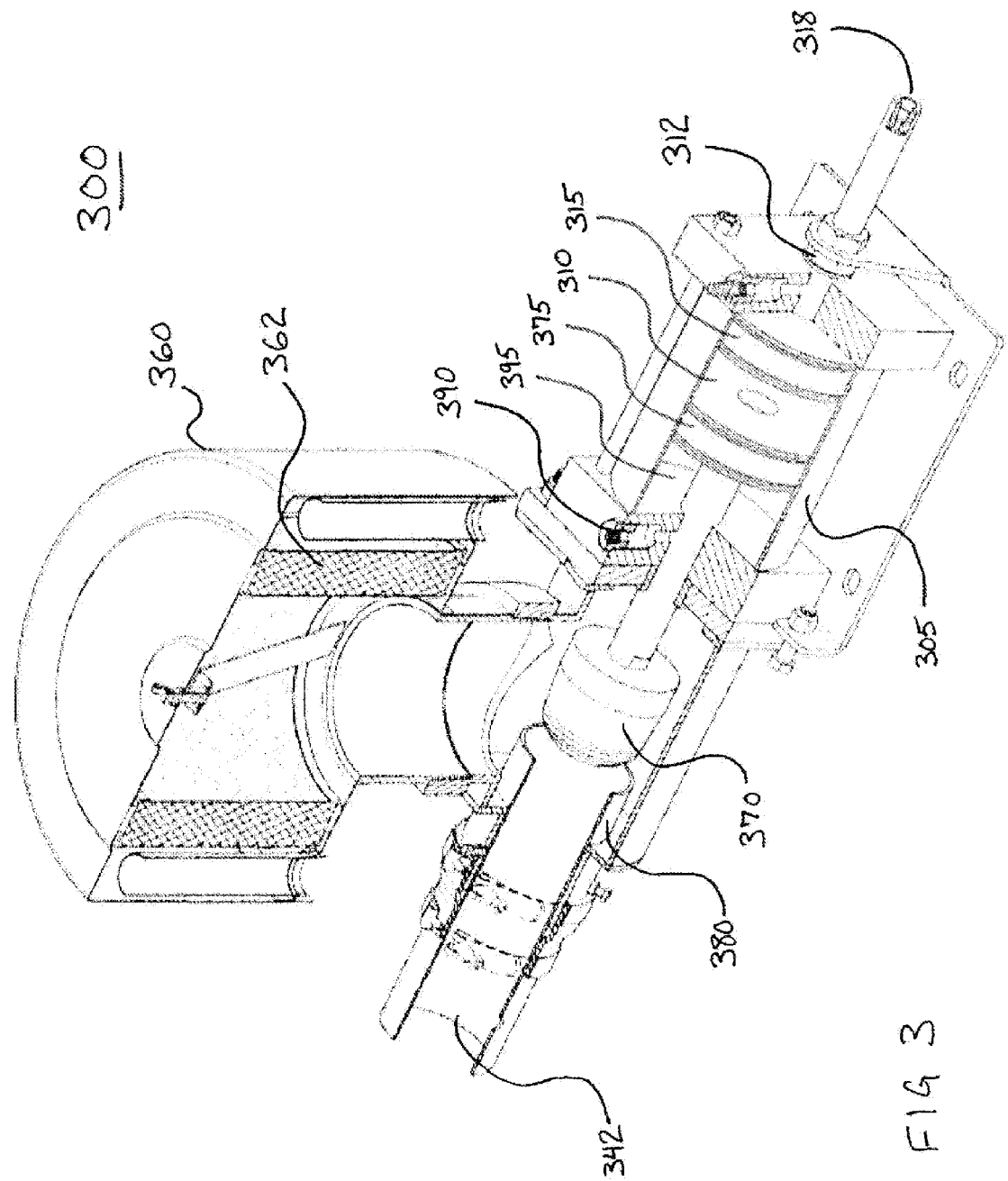
FIG. 3 shows a cutaway perspective of an exemplary embodiment of a mechanically controlled vacuum throttle assembly for a particulate material continuous dense phase pneumatic conveyance system.

Referring to the figures, an exemplary embodiment of a mechanically controlled vacuum throttle assembly 300 for a particulate material continuous dense phase pneumatic conveyance system is shown in FIG. 3. The vacuum throttle assembly 300 of FIG. 3 may be used with the system shown and described in FIG. 1 or similar.

The throttle assembly 300 is located upstream from a blower, or in other words, on the vacuum side of the conveyance line 342. The throttle assembly 300 includes an obstruction element 370 and an opening collar 380. The opening collar 380 is in fluid communication with the vacuum side of the conveyance line 342. The throttle assembly 300 also includes a fluid intake assembly 360. The fluid intake assembly 360 includes an air filter 362.

According to FIG. 3, the obstruction element 370 moves relative to the opening collar 380. The obstruction element 370 includes a sloping, bullet shape, with a smaller cross-sectional diameter at the tip closest to the opening collar 380 and a larger cross-sectional diameter at the end farthest from the opening collar 380. When the obstruction element 370 is withdrawn out of or away from the opening collar 380, the flow of transport fluid mass (i.e., density of transport fluid flow) is increased and the vacuum is decreased. When the obstruction element 370 is fully withdrawn from the opening collar 380, the vacuum is at a minimum, the transport fluid mass flow is at a maximum, and the downstream pressure is at a maximum (see the graph of FIG. 2). Conversely, when the obstruction element 370 is increasingly inserted into the opening collar 380, the flow of transport fluid mass (i.e., density of transport fluid flow) is decreased and the vacuum is increased. When the obstruction element 370 is fully inserted into the opening collar 380, the vacuum is at a maximum, the transport fluid mass flow is at a minimum, and the downstream pressure is at a minimum (see the graph of FIG. 2).

The vacuum throttle assembly 300 includes a pressure pilot assembly 390 in fluid communication with the pressure side of the pneumatic conveyance line (see, for example, 132 or 133 of FIG. 1). The pressure pilot assembly 390 is in fluid communication with an expansion chamber 395. The expansion chamber 395 is defined on one end by a moveable barrier 375. The expansion chamber 395 is contained within a pneumatically sealed housing 305 configured to allow the expansion chamber 395 to expand and contract in size depending on the movement of the moveable barrier 375 based on the fluid pressure within the expansion chamber 395. The moveable barrier 375 is mechanically connected to the obstruction element 370. When the pressure on the pressure side of the conveyance line changes, due to system fluid leakage or particulate material inconsistencies for example, the pressure pilot assembly 390 correspondingly changes the pressure within the expansion chamber 395.

The change in pressure within the expansion chamber 395 correspondingly and mechanically moves the moveable barrier 375 and the connected obstruction element 370. As the pressure on the pressure side (and within the expansion chamber 395) increases, the obstruction element 370 correspondingly and mechanically moves (along with the moveable barrier 375) relative to the opening collar 380 such that the flow of transport fluid mass (i.e., density of transport fluid flow) is decreased and the vacuum correspondingly decreases automatically. As the pressure on the pressure side (and within the expansion chamber 395) decreases, the obstruction element 370 correspondingly and mechanically moves (along with the moveable barrier 375) relative to the opening collar 380 such that the flow of transport fluid mass (i.e., density of transport fluid flow) is increased and the vacuum correspondingly increases automatically.

According to FIG. 3, the vacuum throttle assembly 300 further includes a buffer chamber 310. The buffer chamber 310 is a fixed volume of fluid, preferably air. The buffer chamber 310 is contained within the housing 305 and defined on one end by the moveable barrier 375. On the end opposite the moveable barrier 375, the buffer chamber 310 is defined by a fixed barrier 315. The fixed barrier 315 is securely affixed in a non-moving position within the housing 305. When the pressure within the expansion chamber 395 increases and moves the moveable barrier 375, the movement of the moveable barrier forces the contraction and increased pressure of the buffer chamber 310. When the pressure within the expansion chamber 395 decreases, the increased pressure within the buffer chamber 310 pushes back against the moveable barrier 375 to return it to the position it was in when the system was in low pressure.

The fixed barrier 315 includes an adjustment element 312 so that the position of the fixed barrier 315 can be fine tuned and/or periodically adjusted based on system changes over time and/or different sizes of particulate material to be transported. Generally, the position of the fixed barrier 315 is set during the system initial set up and may possibly be adjusted during periodic maintenance, however, the position of the fixed barrier 315 is generally not adjusted dynamically during normal ongoing system use.

The buffer chamber 310 also includes a buffer chamber vent 318. The buffer chamber vent 318 is a resealable manual valve and is used to periodically calibrate the pressure within the buffer chamber 310 to ambient atmospheric pressure or any other predetermined standardized pressure setting.

Figure 4:
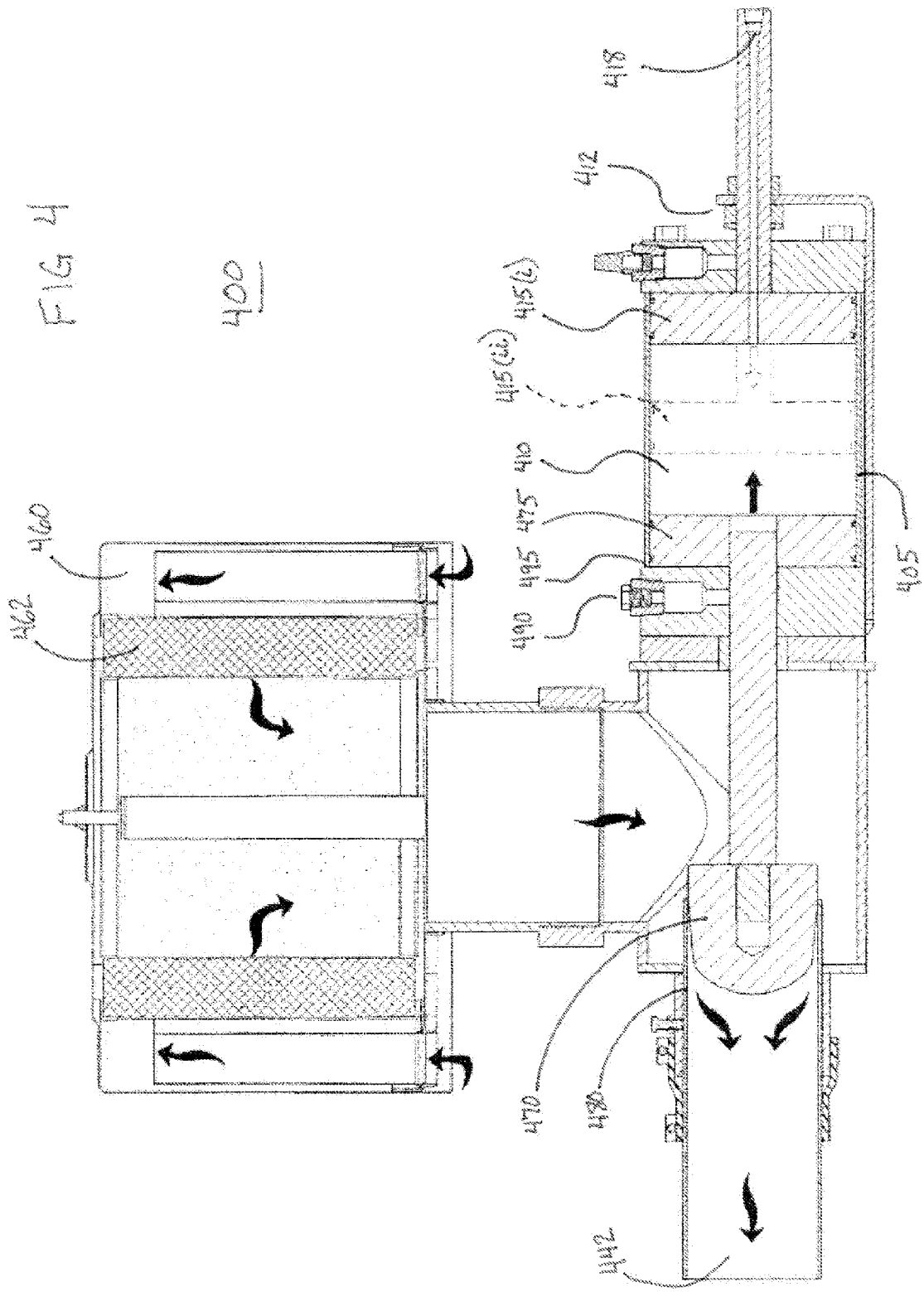
FIG. 4 shows a lengthwise cross-sectional view of an embodiment of a vacuum throttle assembly of the inventive concept.

FIG. 4 shows a lengthwise cross-sectional view of an embodiment of a vacuum throttle assembly of the inventive concept 400. In FIG. 4, the downstream pressure of the conveyance system is at a minimum, low pressure. The obstruction element 470 is fully inserted within the opening collar 480. A high vacuum environment (low fluid mass density flow) is created on the vacuum side of the conveyance line 442. FIG. 4 also shows the fluid intake assembly 460 and air filter 462.

According to FIG. 4, the downstream pressure of the conveyance system is at a minimum. The pressure pilot assembly 490 is in fluid communication with the downstream pressure (not shown). The expansion chamber 495 is reduced to a minimum size and volume. The moveable barrier 475 is at an extreme position within the pneumatic housing 405, keeping the obstruction element 470 fully inserted within the opening collar 480. Consequently, the buffer chamber 410 is at a maximum capacity within the pneumatic housing 405.

With the buffer chamber 410 at a maximum capacity and the obstruction element 470 fully obstructing the opening collar 480, a user seals the buffer chamber vent 418 and uses the adjustment element 412 to adjust the fixed barrier 415 to a desired position 415(ii).

Figure 5:
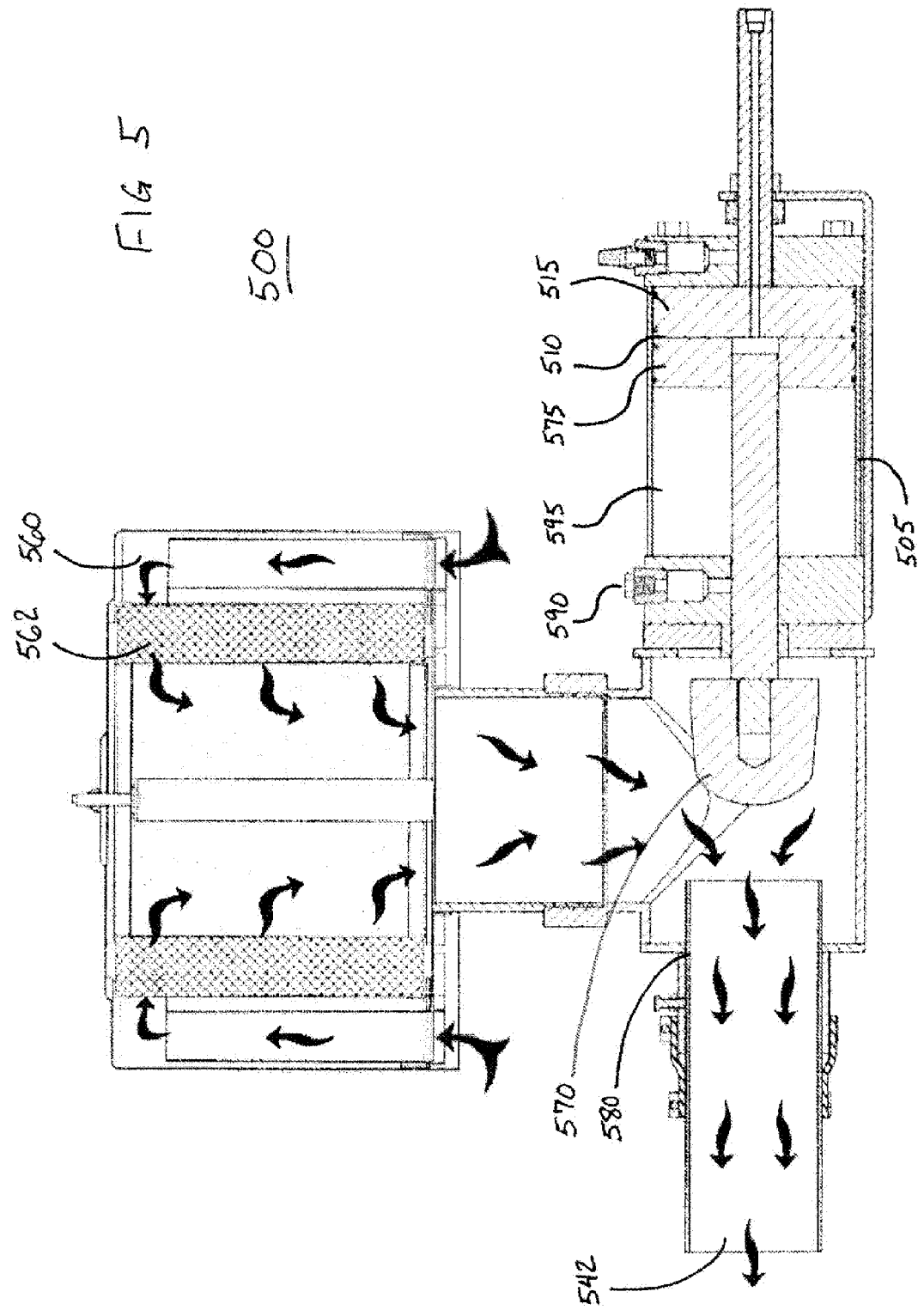
FIG. 5 shows a lengthwise cross-sectional view of the embodiment of FIG. 4 used in a high pressure, low vacuum condition.

FIG. 5 shows the embodiment of FIG. 4 used in a high pressure, low vacuum condition 500. In FIG. 5, the downstream pressure of the conveyance system is at a maximum, high pressure. The obstruction element 570 is fully withdrawn from the opening collar 580. A low vacuum environment (high fluid mass density flow) is created on the vacuum side of the conveyance line 542. FIG. 5 also shows the fluid intake assembly 560 and air filter 562.

According to FIG. 5, the downstream pressure of the conveyance system is at a maximum. The pressure pilot assembly 590 is in fluid communication with the downstream pressure (not shown). The expansion chamber 595 is expanded to a maximum size and volume. The moveable barrier 575 is at an extreme position within the pneumatic housing 505. The buffer chamber 510 is at a minimum capacity within the pneumatic housing 505.

Figure 6:
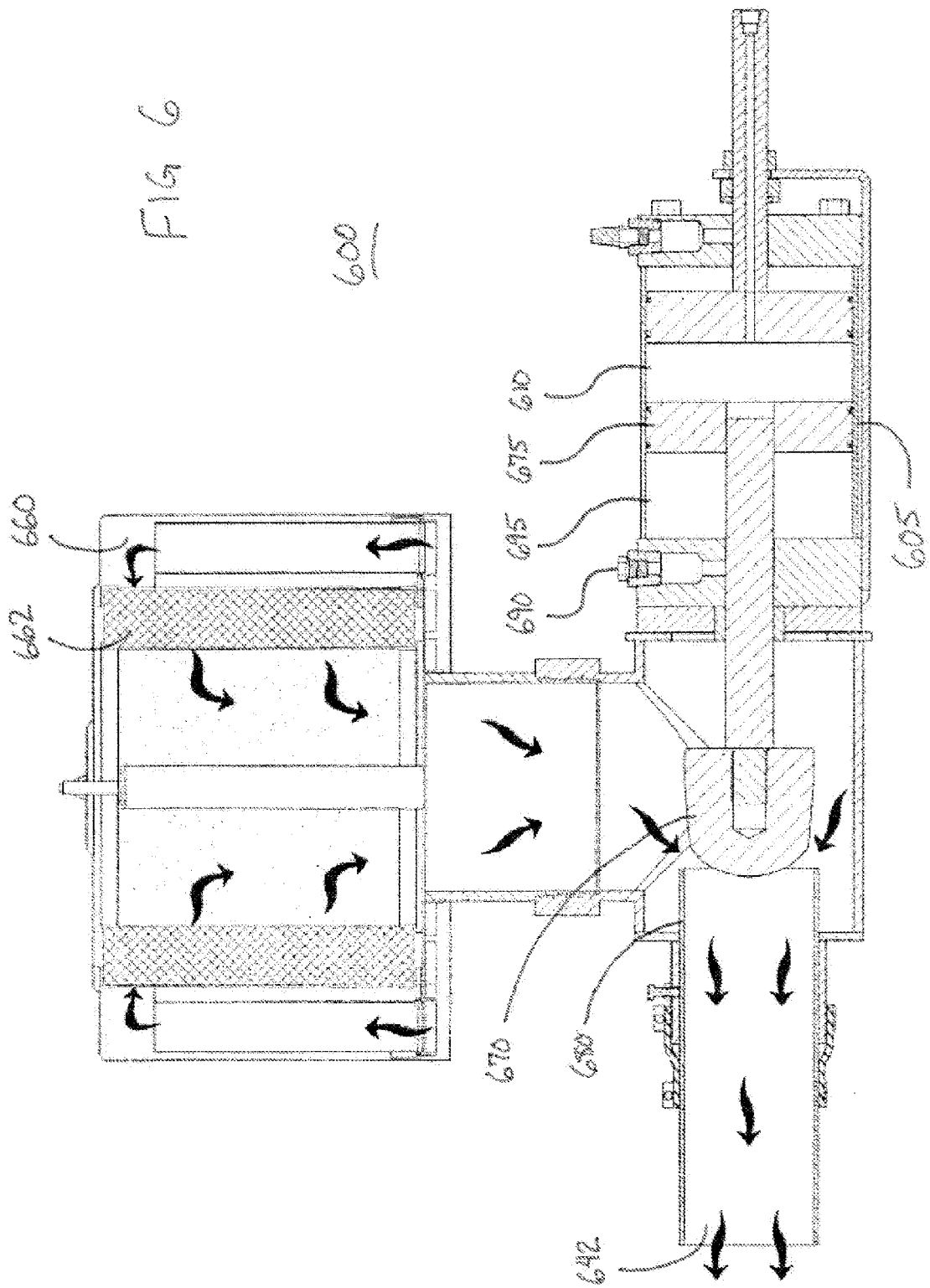
FIG. 6 shows a lengthwise cross-sectional view of the embodiment of FIGS. 4 and 5 used in a mid-pressure, mid-vacuum condition.

FIG. 6 shows the embodiment of FIGS. 4 and 5 used in a mid-pressure, mid-vacuum condition 600. In FIG. 6, the downstream pressure of the conveyance system is at a middle level pressure, neither at a maximum nor minimum. The obstruction element 670 is partially withdrawn from the opening collar 680. A mid-level vacuum environment (mid-range fluid mass density flow) is created on the vacuum side of the conveyance line 642. FIG. 6 also shows the fluid intake assembly 660 and air filter 662.

According to FIG. 6, the downstream pressure of the conveyance system is somewhere in between maximum and minimum system capacity. The pressure pilot assembly 690 is in fluid communication with the downstream pressure (not shown). The expansion chamber 695 is expanded to a mid-range size and volume. The moveable barrier 675 is at a mid-range position within the pneumatic housing 605. The buffer chamber 610 is at a mid-range capacity within the pneumatic housing 605.

Figure 7:
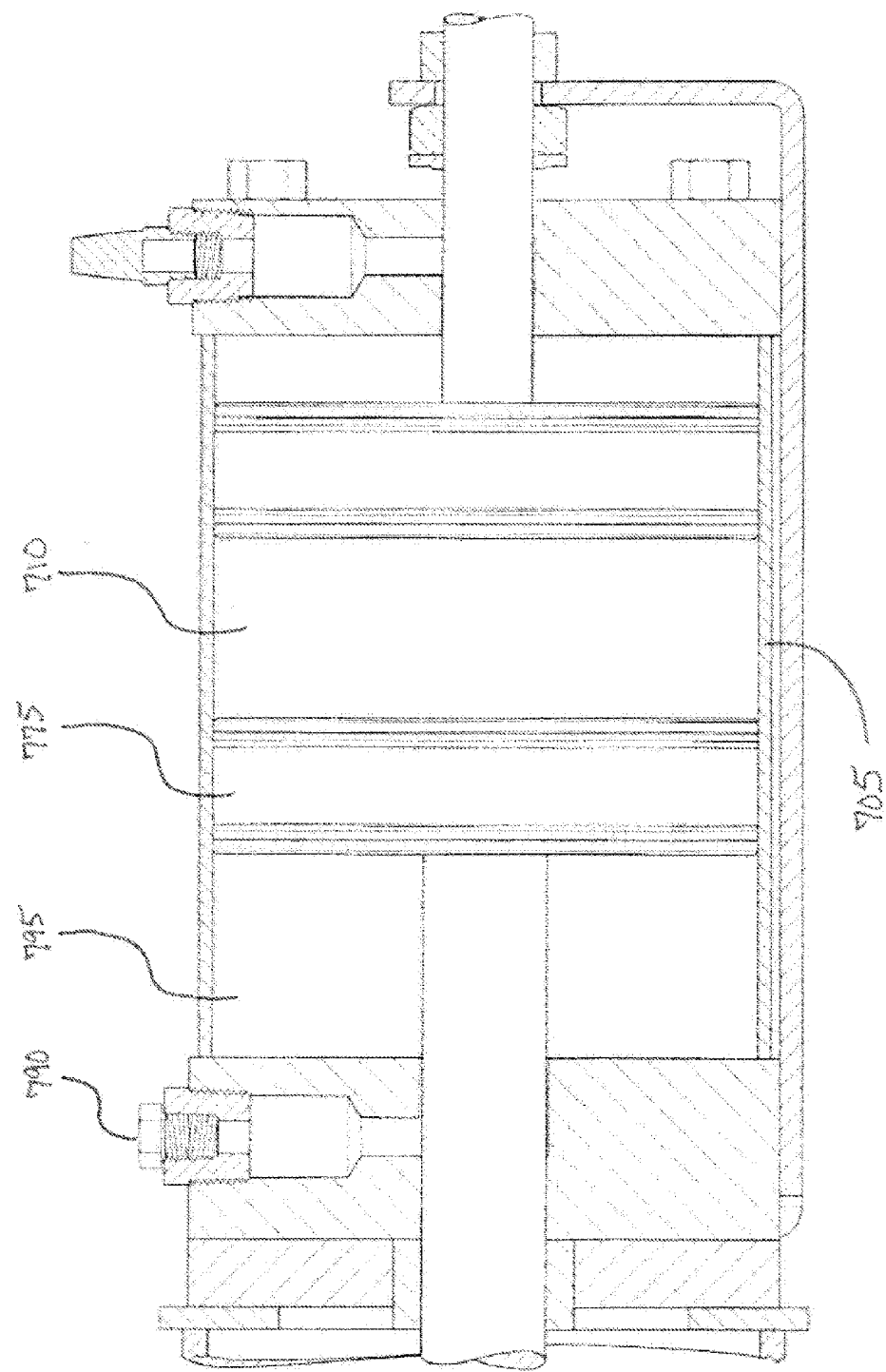
FIG. 7 shows an enlarged segment of the embodiment of FIGS. 4-6.
Figure 9A:
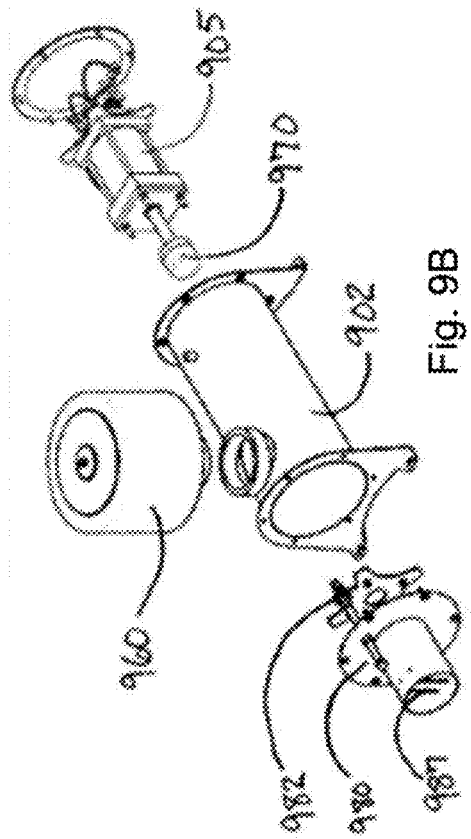
FIG. 9 shows five views of another embodiment of a vacuum throttle assembly of the inventive concept.
Figure 9B:
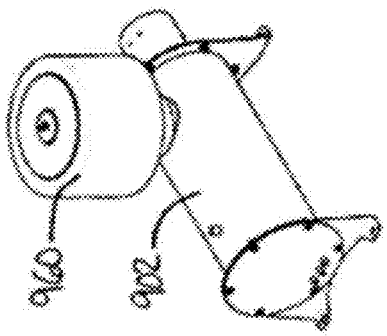
Figure 9C:
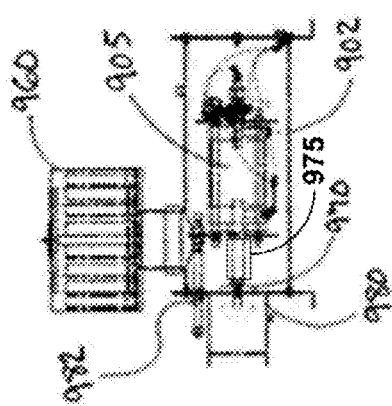
Figure 9D:
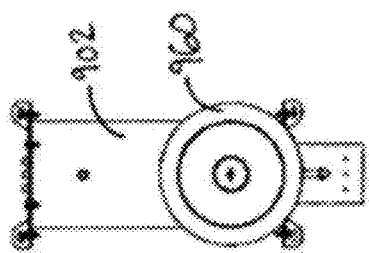
Figure 9E:
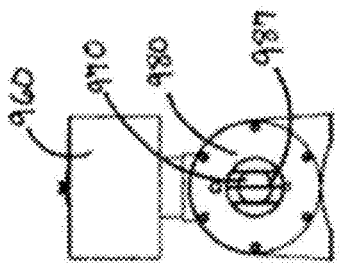

FIG. 7 shows an enlarged segment of the embodiment of FIGS. 4-6. In FIG. 7, a portion of the pressure pilot assembly 790 is shown. The pneumatic housing 705 is shown containing the expansion chamber 795 and buffer chamber 710. According to FIG. 7, the moveable barrier 775 is positioned between a minimum and maximum. The moveable barrier is mechanically connected to an obstruction element (not shown).

FIG. 8 is a lengthwise cross-sectional view of another embodiment of a vacuum throttle assembly of the inventive concept 800. In FIG. 8, the downstream pressure of the conveyance system is at a relatively high, but not necessarily maximum pressure. The obstruction element 870 is nearly fully withdrawn from the opening collar 880. A somewhat lower vacuum environment (higher fluid mass density flow) is created on the vacuum side of the conveyance line 842. The embodiment shown in FIG. 8 also includes an opening collar adjustment element 882. The opening collar adjustment element 882 is configured to allow a user to manually adjust the position of the opening collar 880 relative to the obstruction element 870. The opening collar adjustment element 882 is used to fine tune the position of the opening collar 880 relative to the obstruction element 870 in order to optimize minimum and maximum fluid flow rates. FIG. 8 also shows the fluid intake assembly 860 and air filter 862.

According to FIG. 8, the downstream pressure of the conveyance system is near a maximum. The pressure pilot assembly 890 is in fluid communication with the downstream pressure (not shown). The expansion chamber 895 is near a minimum size and volume. The moveable barrier 875 is near an extreme position within the pneumatic housing 805, keeping the obstruction element 870 nearly fully withdrawn from the opening collar 880. Consequently, the buffer chamber 810 is near a maximum capacity within the pneumatic housing 805.

FIG. 9 shows five views of another embodiment of a vacuum throttle assembly of the inventive concept 900. FIG. 9-A shows a top view. FIG. 9-B shows an exploded perspective. FIG. 9-C shows a vacuum side end view. FIG. 9-D shows a longitudinal cross-sectional view. FIG. 9-E shows a perspective view.

Obstruction element 970 and opening collar 980 are shown in FIGS. 9-B, 9-C, and 9-D. An opening collar adjustment element 982 is shown in FIGS. 9-B and 9-D. The opening collar adjustment element 982 is configured to allow a user to manually adjust the position of the opening collar 980 relative to the obstruction element 970. FIG. 9 also shows the fluid intake assembly 960. In some embodiments, the fluid intake assembly 960 is a sealed reservoir of compressed gas. In other embodiments, the fluid intake assembly 960 is in fluid communication with a sealed reservoir of compressed gas. FIG. 9 also shows the vacuum throttle assembly enclosed within a protective outer casing 902. In some embodiments, the vacuum throttling assembly includes a return mechanism 905. In some such embodiments, the return mechanism is configured to bias the vacuum throttling assembly to a low rate of transport fluid mass density flow when the downstream pressure is low and/or to a high rate of transport fluid mass density flow when the downstream pressure is high. In other such embodiments, the return mechanism is a spring or other mechanical device. FIGS. 9-B and 9-C also show a debris grate 987 positioned downstream of the opening collar 980. The debris grate 987 is configured to prevent unwanted debris, such as the obstruction element 970 or other components or parts from being drawn into the vacuum side of the conveyance line.

In other aspects, the inventive concept relates to a method of mechanically controlling air mass flow rate in a particulate material continuous dense phase pneumatic conveyance system having a conveyance line with a vacuum side and a pressure side. The method includes mechanically moving an obstruction element relative to an opening collar on the vacuum side of the conveyance line. The distance and direction of movement of the obstruction element relative to the opening collar occurs automatically depending on the pressure of the pressure side of the conveyance line. When the pressure on the pressure side of the conveyance line increases, the obstruction element moves relative to the opening collar such that the flow of transport fluid mass (i.e., density of transport fluid flow) is increased. When the pressure on the pressure side of the conveyance line decreases, the obstruction element moves relative to the opening collar such that the flow of transport fluid mass (i.e., density of transport fluid flow) is restricted.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration is by way of example, and the scope of the inventions is not limited to the exact details shown or described.

Although the foregoing detailed description has been described by reference to an exemplary embodiment, and the best mode contemplated for carrying out the present inventive concept has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A continuous dense phase pneumatic conveying system for transporting particulate material through a conveyance line with a transport fluid, said pneumatic conveying system comprising:
   a conveyance line;
   a particulate material insertion assembly configured to insert particulate material from a particulate material supply into the conveyance line;
   a positive displacement blower disposed upstream of the particulate material insertion assembly, said blower configured to feed transport fluid through the conveyance line to transport the particulate material;
   a transport fluid intake assembly disposed upstream of the blower, said transport fluid intake assembly configured to provide transport fluid from a transport fluid supply into the blower through a transport fluid supply line; and
   a mechanically controlled vacuum throttling assembly disposed upstream of the blower, a portion of said vacuum throttling assembly being in fluid communication with the transport fluid pressure downstream of the blower, said vacuum throttling assembly configured to vary the flow of the transport fluid into the blower depending on the transport fluid pressure downstream of the blower.

2. The system of claim 1, wherein said vacuum throttling assembly is configured to vary the mass density of the flow of the transport fluid into the blower depending on the transport fluid pressure downstream of the blower.

3. The system of claim 1, wherein said portion of said vacuum throttling assembly being in fluid communication with the transport fluid pressure downstream of the blower is a pressure pilot expansion chamber configured to expand as the downstream pressure increases and contract as the downstream pressure decreases.

4. The system of claim 1, wherein said vacuum throttling assembly comprises an opening collar in fluid communication with said transport fluid supply line, and an obstruction element, said obstruction element and said opening collar being configured to mate one with the other and move one relative to the other such that a fluid mass density flow rate through the opening collar is variable depending on the movement of the obstruction element relative to the opening collar.

5. The system of claim 4, wherein said movement of said obstruction element relative to said opening collar is dependent on a change in downstream pressure.

6. The system of claim 4, wherein when the downstream pressure increases, said obstruction element moves relative to said opening collar such that said fluid mass density flow rate through said opening collar correspondingly increases.

7. The system of claim 4, wherein when the downstream pressure decreases, said obstruction element moves relative to said opening collar such that said fluid mass density flow rate through said opening collar correspondingly decreases.

8. The system of claim 1, wherein said transport fluid is air.

9. The system of claim 1, wherein said transport fluid is an inert gas.

10. The system of claim 1, wherein said transport fluid supply is a sealed reservoir of compressed gas.

11. The system of claim 1, wherein said vacuum throttling assembly further comprises a return mechanism configured to bias the vacuum throttling assembly to a low rate of transport fluid mass density flow when the downstream pressure is low.

12. The system of claim 1, wherein said vacuum throttling assembly further comprises a return mechanism configured to bias the vacuum throttling assembly to a high rate of transport fluid mass density flow when the downstream pressure is high.

13. The system of claim 12, wherein said return mechanism is a spring.

14. The system of claim 12, wherein said return mechanism is a pressure pilot buffer chamber configured to expand and contract in opposition to said expansion chamber.

15. The system of claim 14, wherein said buffer chamber is configured to contain a predetermined fixed volume of air.

16. The system of claim 1, wherein said blower is configured to move a constant volume of transport fluid of variable fluid mass densities.

17. The system of claim 4, wherein said obstruction element is connected to a moveable barrier, said barrier being configured to move said obstruction element relative to said opening collar to vary the flow rate of transport fluid mass density depending on the downstream pressure.

18. The system of claim 1, wherein said system is devoid of any pressure transducer or PLC between the intake and insertion assemblies.

19. The system of claim 1, wherein said insertion assembly is comprised of an airlock and a pick up shoe.

20. The system of claim 19, wherein said airlock includes a rotor with 9 or 10 vanes.

* * * * *